(12) United States Patent
Yasui

(10) Patent No.: US 12,379,223 B2
(45) Date of Patent: Aug. 5, 2025

(54) INFORMATION DISPLAY DEVICE AND CONTROL METHOD

(71) Applicant: MICWARE CO., LTD., Hyogo (JP)

(72) Inventor: Yurie Yasui, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 0 days.

(21) Appl. No.: 18/799,657

(22) Filed: Aug. 9, 2024

(65) Prior Publication Data

US 2024/0401969 A1 Dec. 5, 2024

Related U.S. Application Data

(63) Continuation of application No. PCT/JP2023/014251, filed on Apr. 6, 2023.

(30) Foreign Application Priority Data

May 13, 2022 (JP) ................. 2022-079803

(51) Int. Cl.
*G01C 21/00* (2006.01)
*G01C 21/36* (2006.01)

(52) U.S. Cl.
CPC ..... *G01C 21/3682* (2013.01); *G01C 21/3664* (2013.01)

(58) Field of Classification Search
CPC .......................... G01C 21/3682; G01C 21/3664
See application file for complete search history.

(56) References Cited

U.S. PATENT DOCUMENTS

| 2017/0087999 A1* | 3/2017 | Miller ..................... B60L 58/12 |
| 2020/0072626 A1* | 3/2020 | Kumar .................... B60L 53/32 |
| 2023/0015682 A1* | 1/2023 | Quint ................. G01C 21/3694 |

FOREIGN PATENT DOCUMENTS

| JP | H09-210702 A | 8/1997 |
| JP | 2007-171098 A | 7/2007 |
| JP | 2009-103989 A | 5/2009 |
| JP | 2011-227050 A | 11/2011 |
| JP | 2014-035215 A | 2/2014 |
| JP | 2017-125825 A | 7/2017 |

OTHER PUBLICATIONS

International Search Report issued in PCT/JP2023/014251 mailed on Jun. 20, 2023 with English Translation (5 pages).

(Continued)

*Primary Examiner* — Wade Miles
*Assistant Examiner* — Aaron G Cain
(74) *Attorney, Agent, or Firm* — Nakanishi IP Associates, LLC

(57) ABSTRACT

An information display device (1) includes a display device (12) that displays a route list and a control device (14) that controls the display device (12). Upon receipt of an instruction from a user, the control device (14) switches one simplified route diagram to another simplified route diagram, the one simplified route diagram including the names of two or more safety-zone facilities that are located closest to the current location, the other simplified route diagram including the name of a caution-zone facility that is located on the route ahead of the safety-zone facilities.

4 Claims, 14 Drawing Sheets

(56) References Cited

OTHER PUBLICATIONS

Written Opinion of International Searching Authority mailed on PCT/JP2023/014251 mailed on Jun. 20, 2023 with English Translation (6 pages).
Notice of Reasons for Refusal issued in Japanese Patent Application No. 2024-520300 mailed on Nov. 27, 2024 with English Translation (6 pages).
Decision to Grant Patent issued in Japanese Patent Application No. 2024-520300 mailed on Dec. 11, 2024, with English Translation (5 pages).

* cited by examiner

[FIG.1]
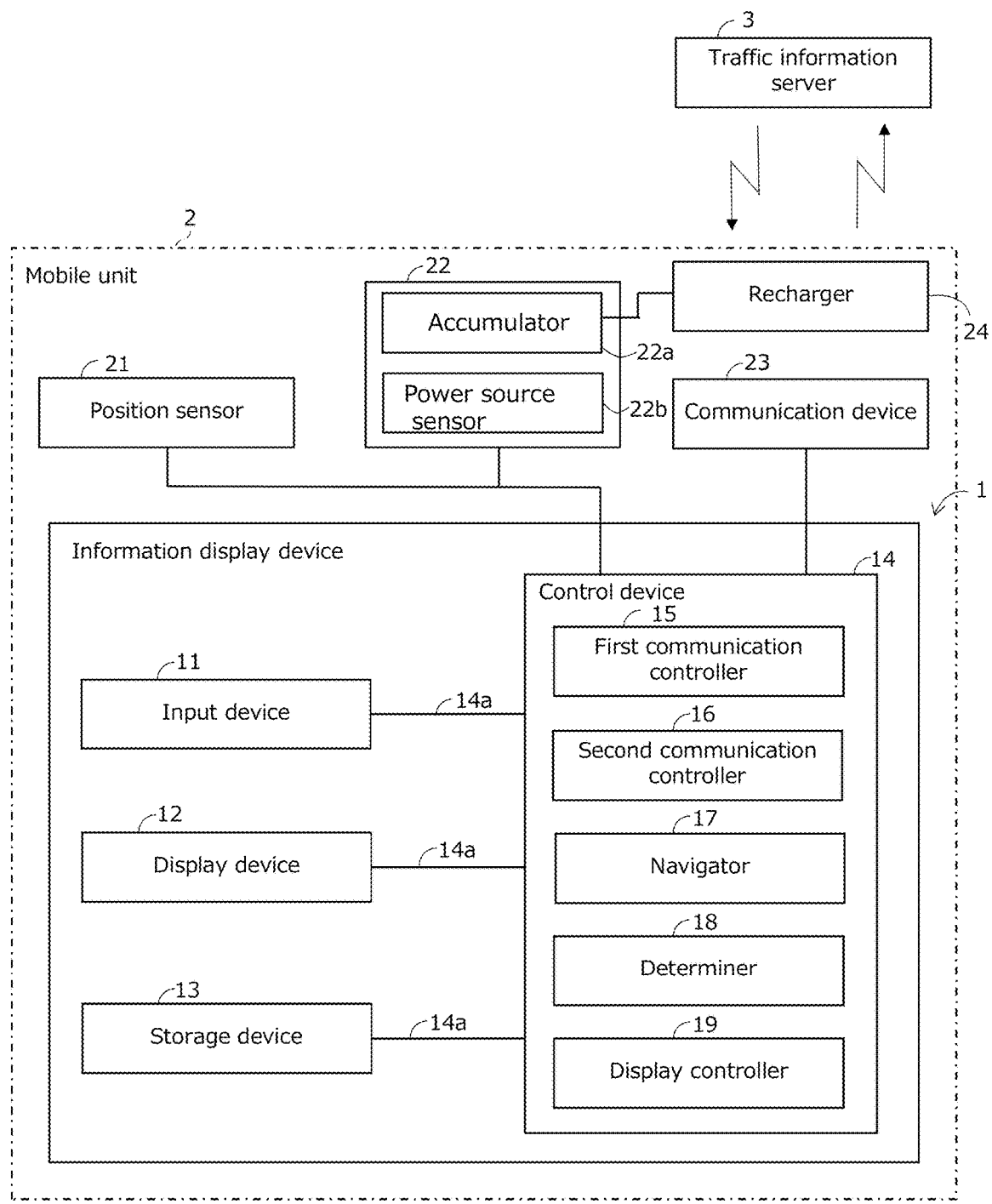

[FIG.2]
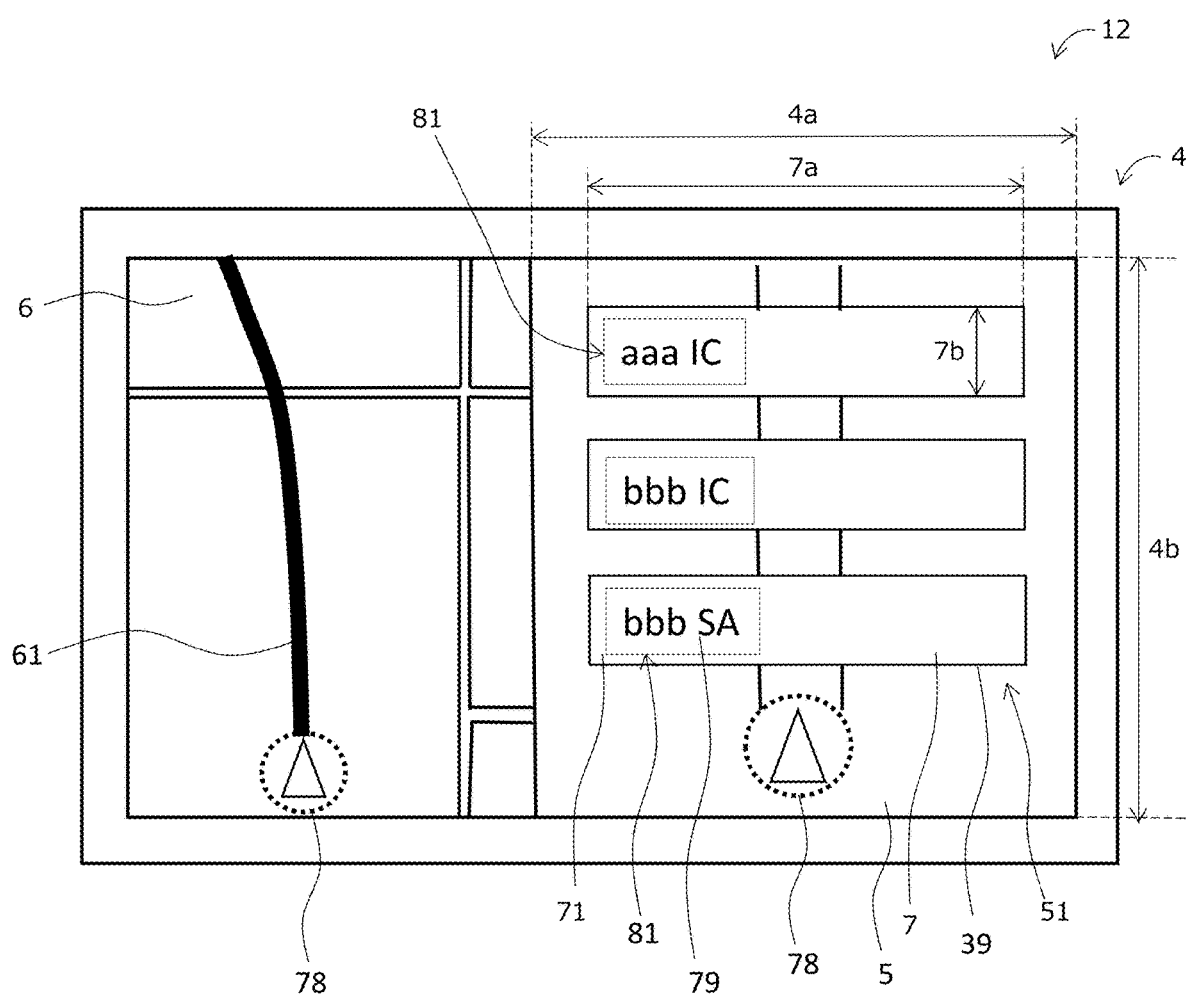

[FIG.3]

| Facilities | | |
|---|---|---|
| Recharging facilities (with recharging equipment) | Accessible facilities (first graphic 7) | Safety-zone facilities (safety-zone facility graphic 71) |
| | | Caution-zone facilities (caution-zone facility graphic 72) |
| | | Warning-zone facilities (warning-zone facility graphic 73) |
| | | Danger-zone facilities (danger-zone facility graphic 74) |
| | Inaccessible facilities (second graphic 8) | |
| Facilities with no recharging equipment | | |

[FIG.4]
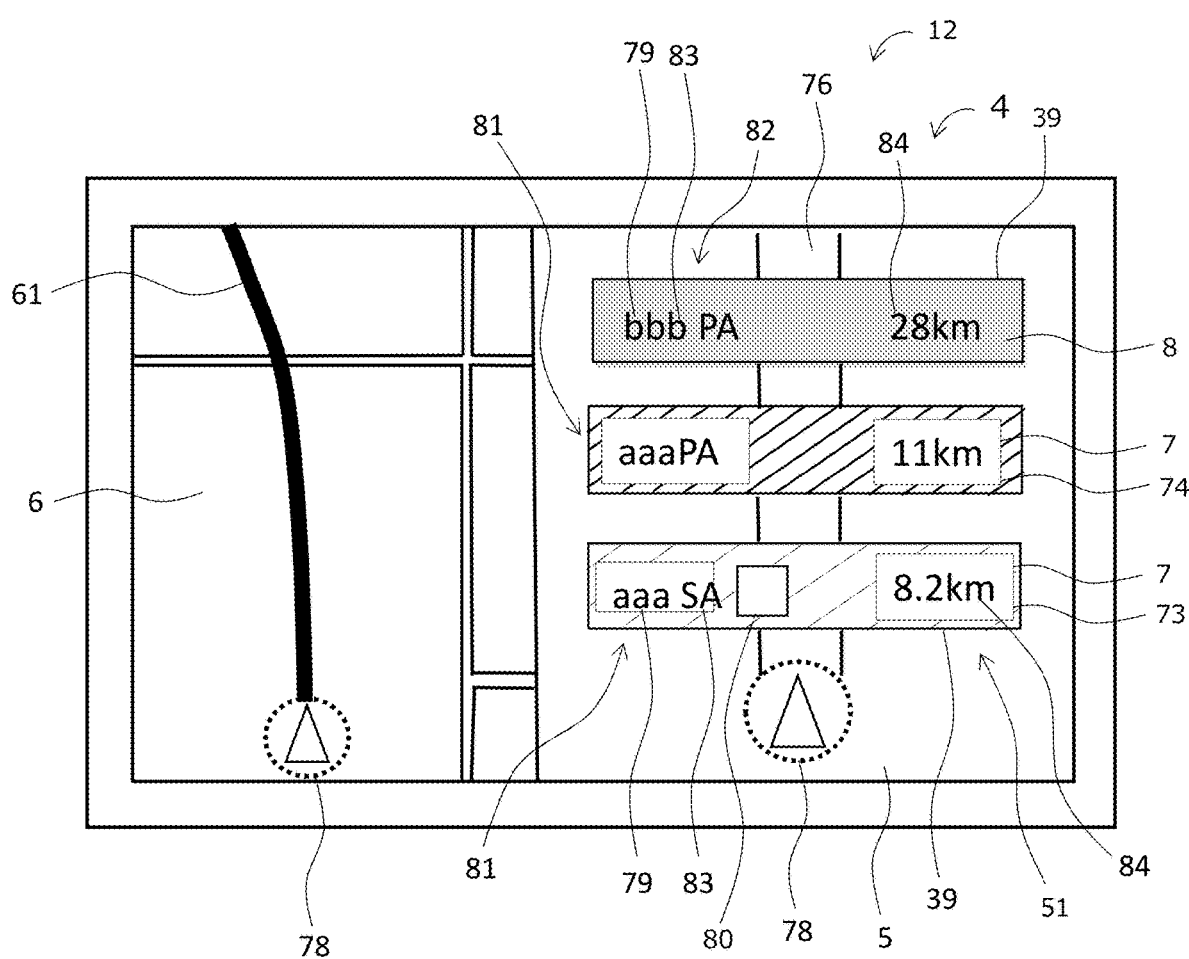

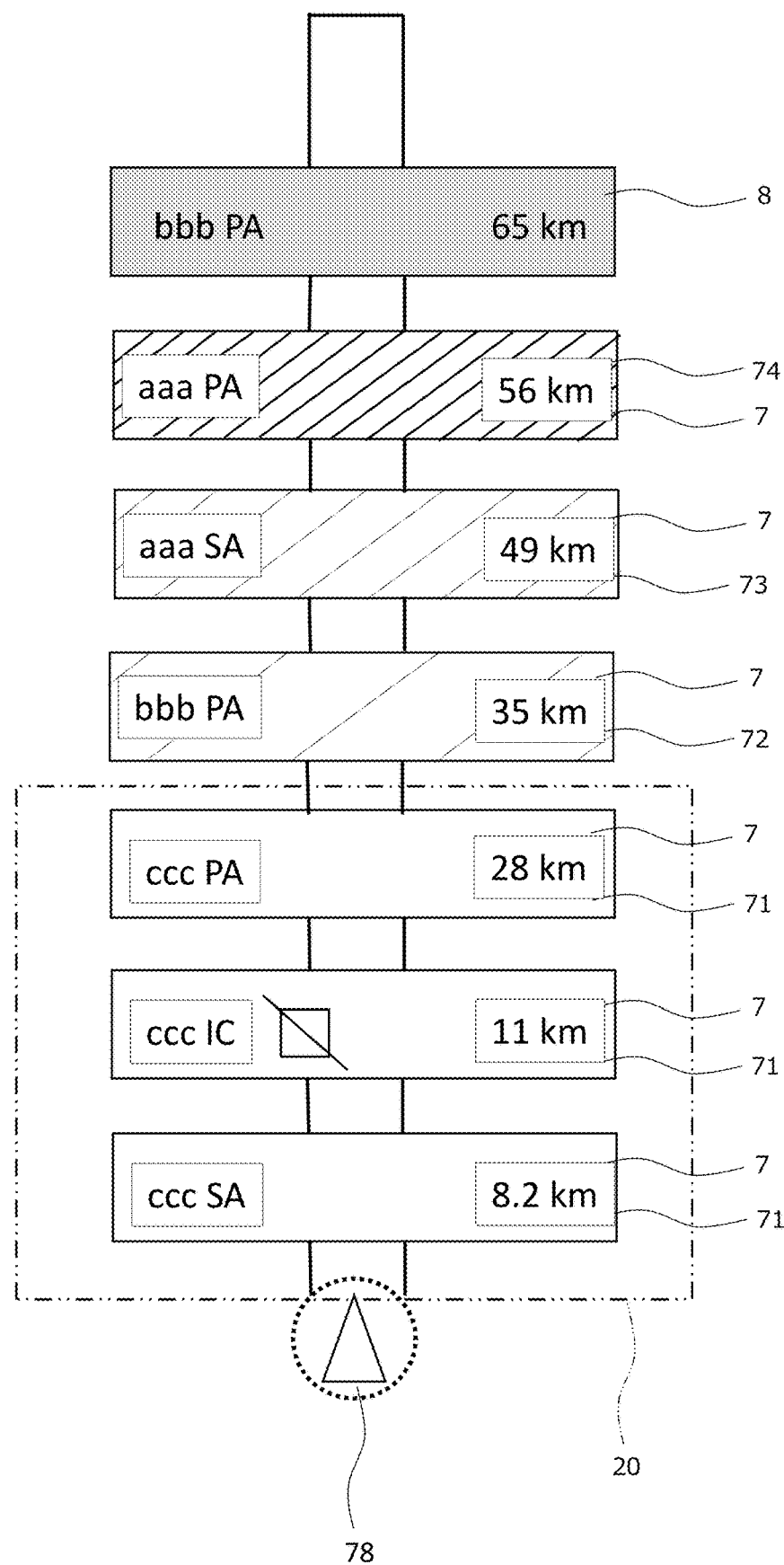
[FIG.5]

[FIG.6]
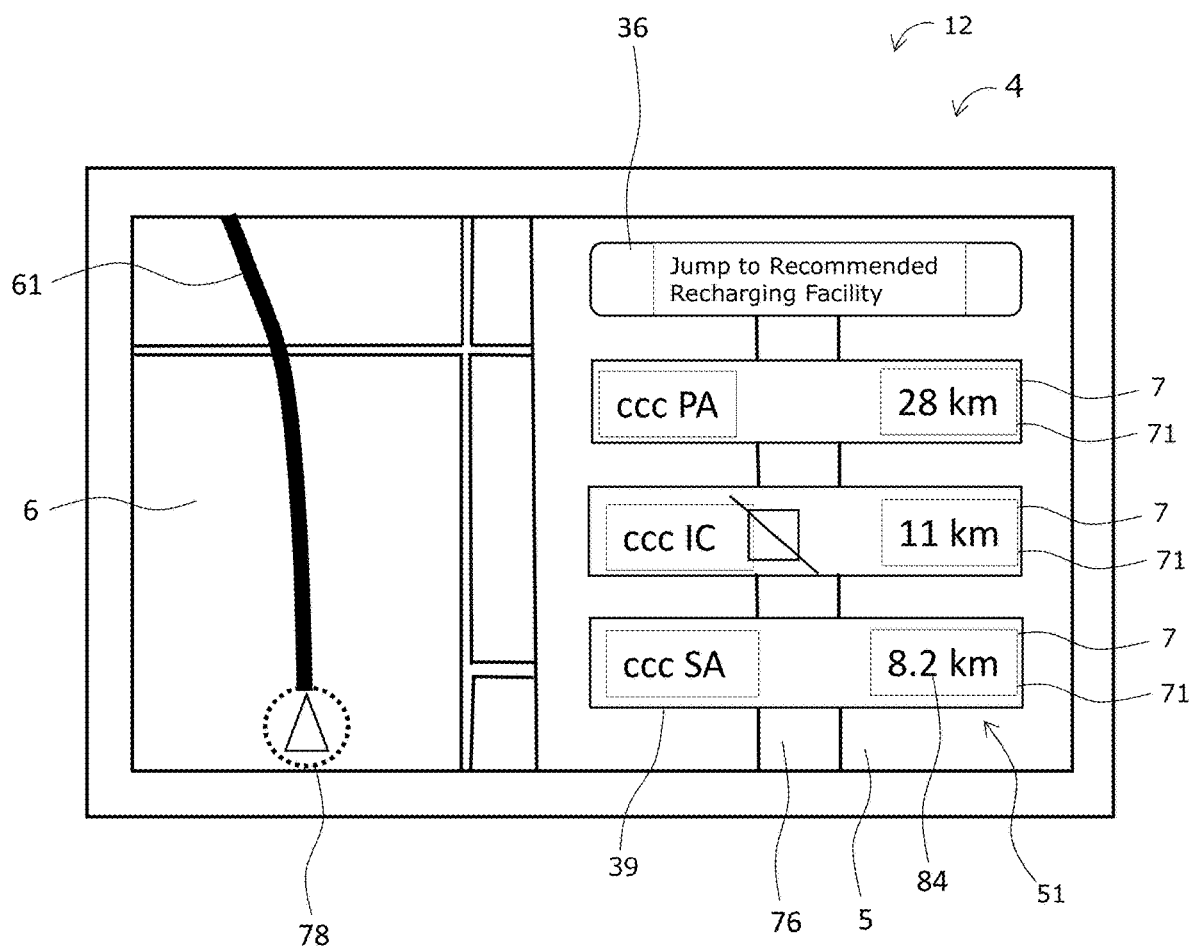

[FIG.7]
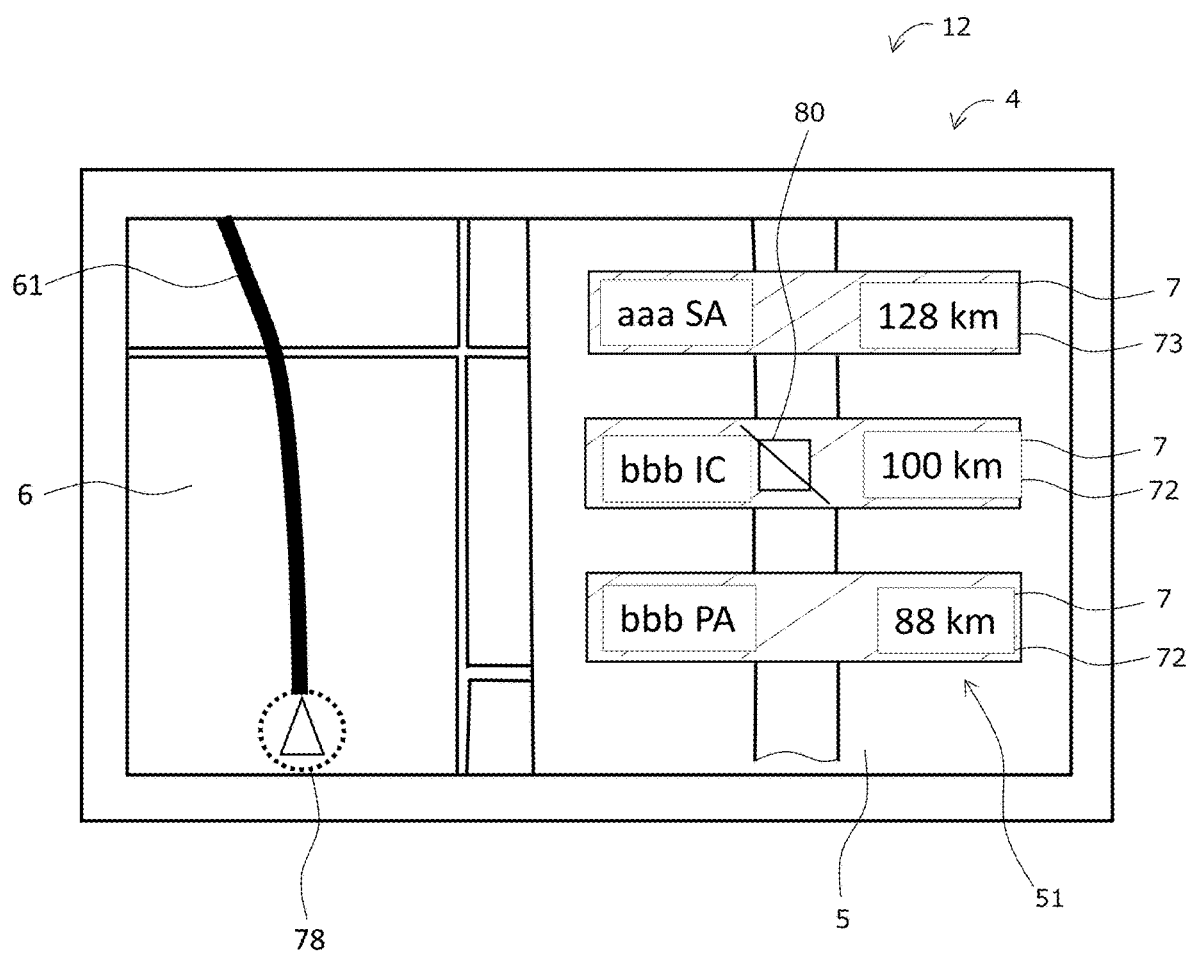

[FIG.8]

| Target for display | Type of traffic information | | |
|---|---|---|---|
| | Traffic jam | Road closing | Events (icons such as accidents or roadworks) |
| Safety-zone facility | Display | Display | Display |
| Caution-zone facility | No display when identification is difficult. | Display | Display |
| Danger-zone facility | No display when identification becomes difficult. | Display | Display |

[FIG.9]
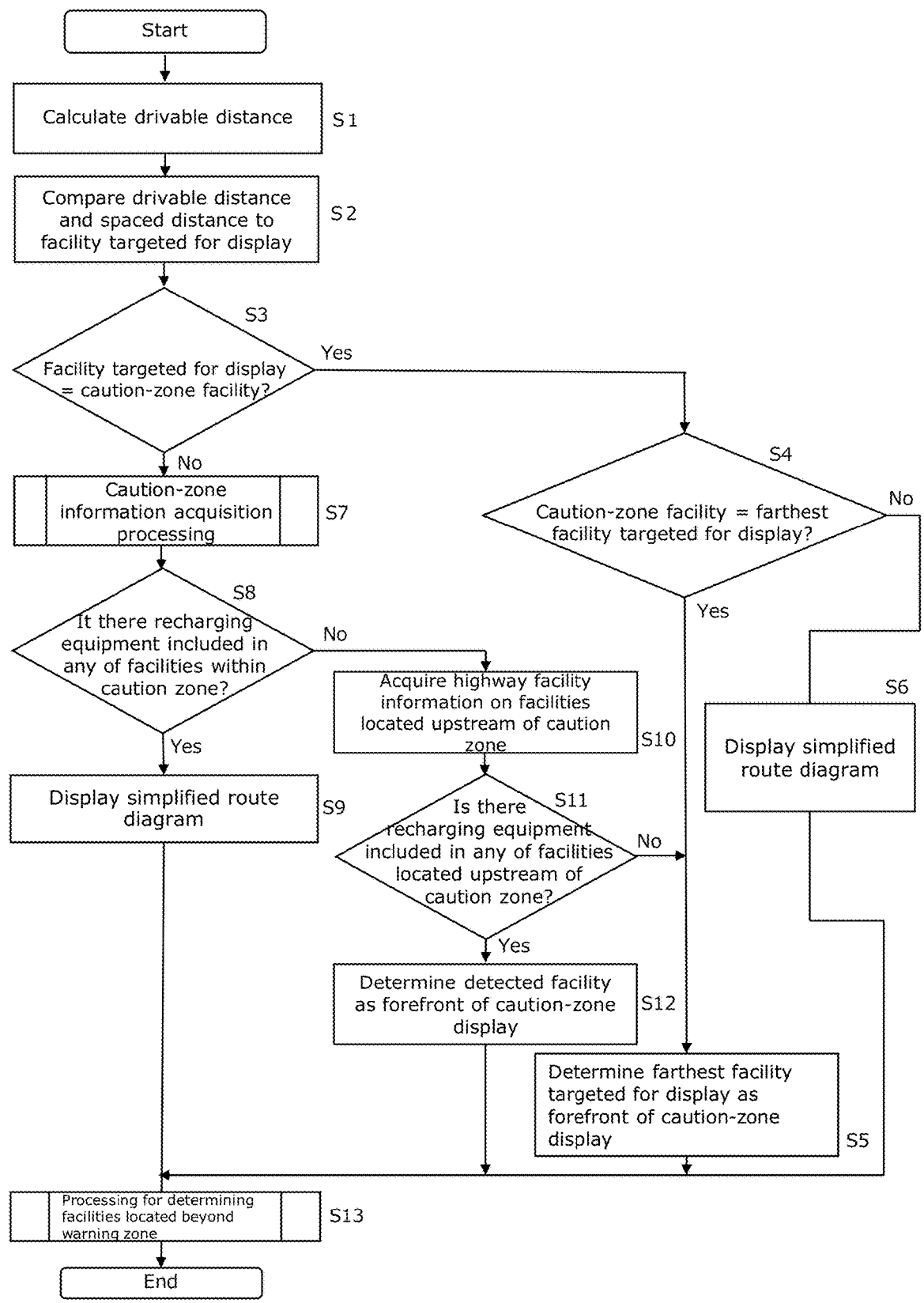

[FIG.10]
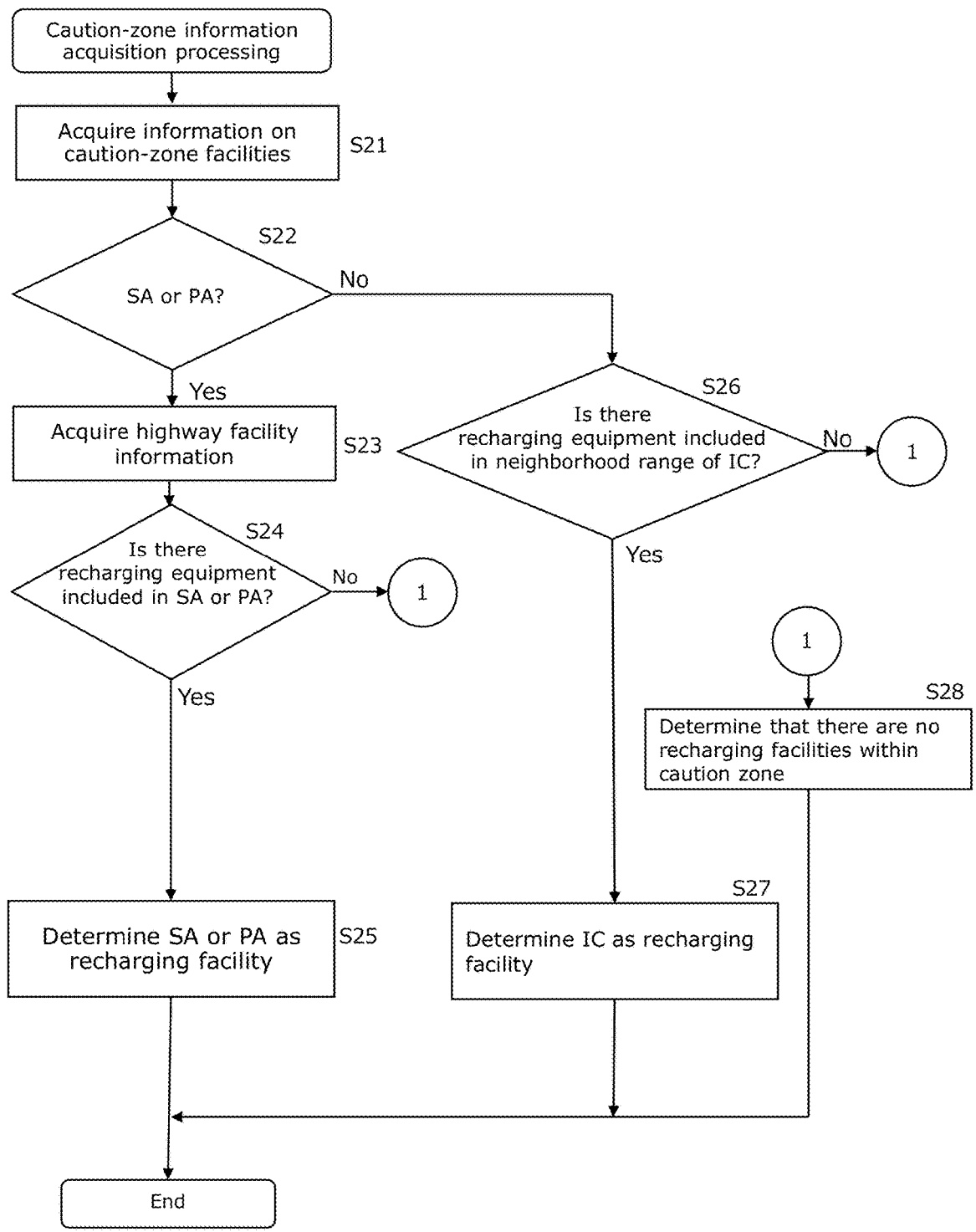

[FIG.11]
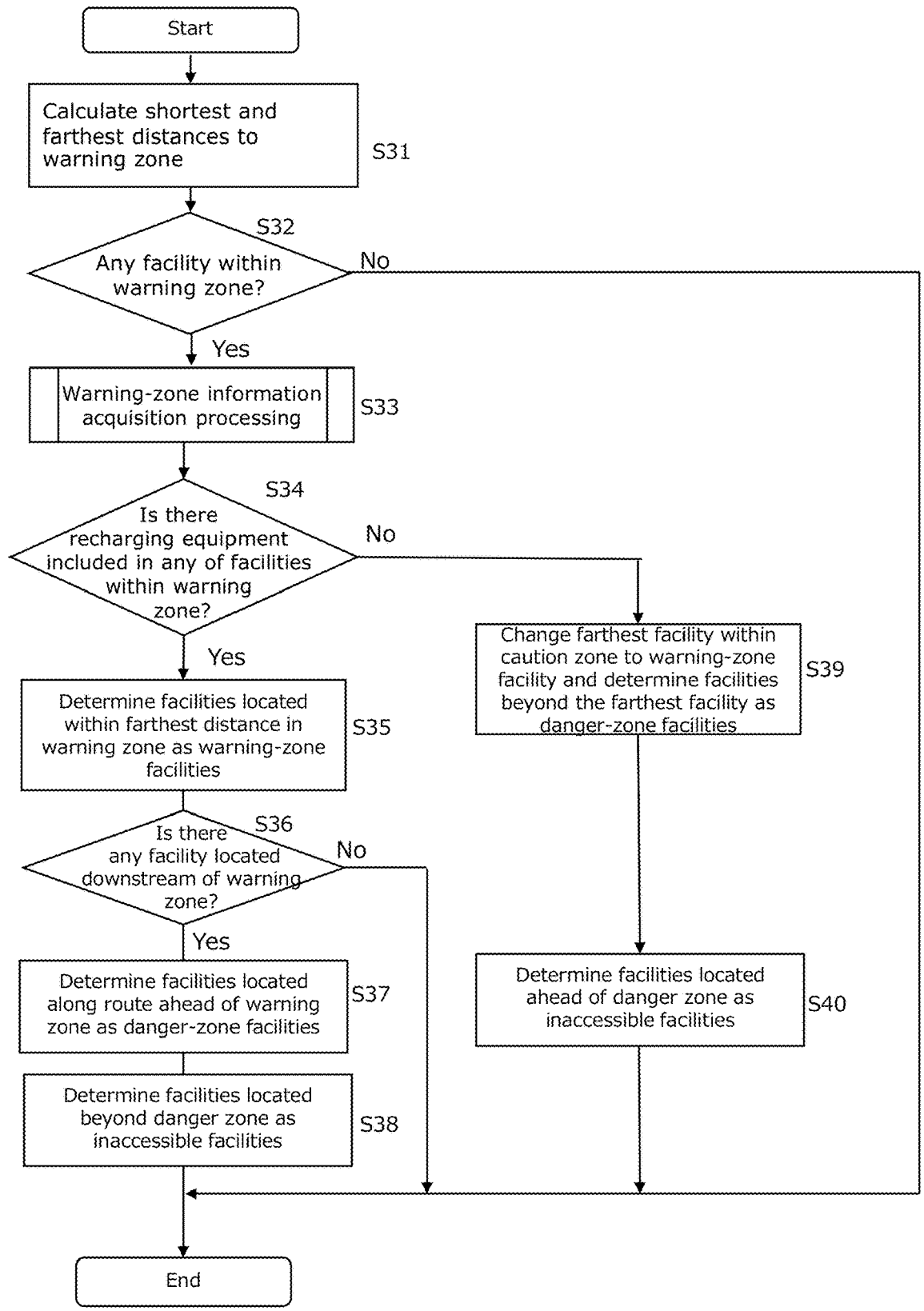

[FIG.1 2]
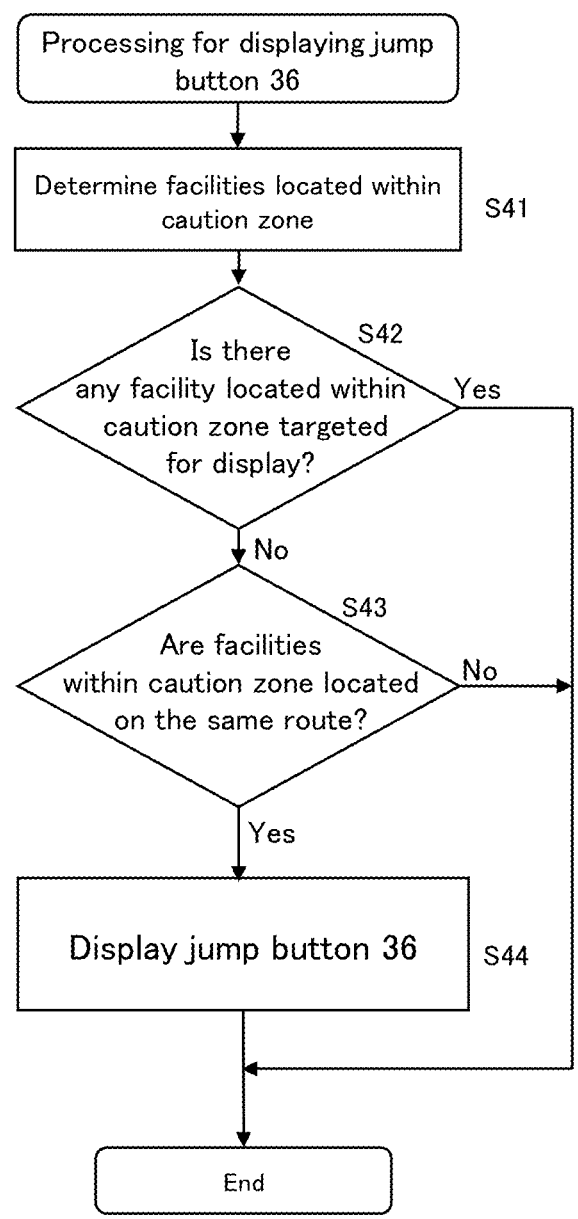

[FIG.13]
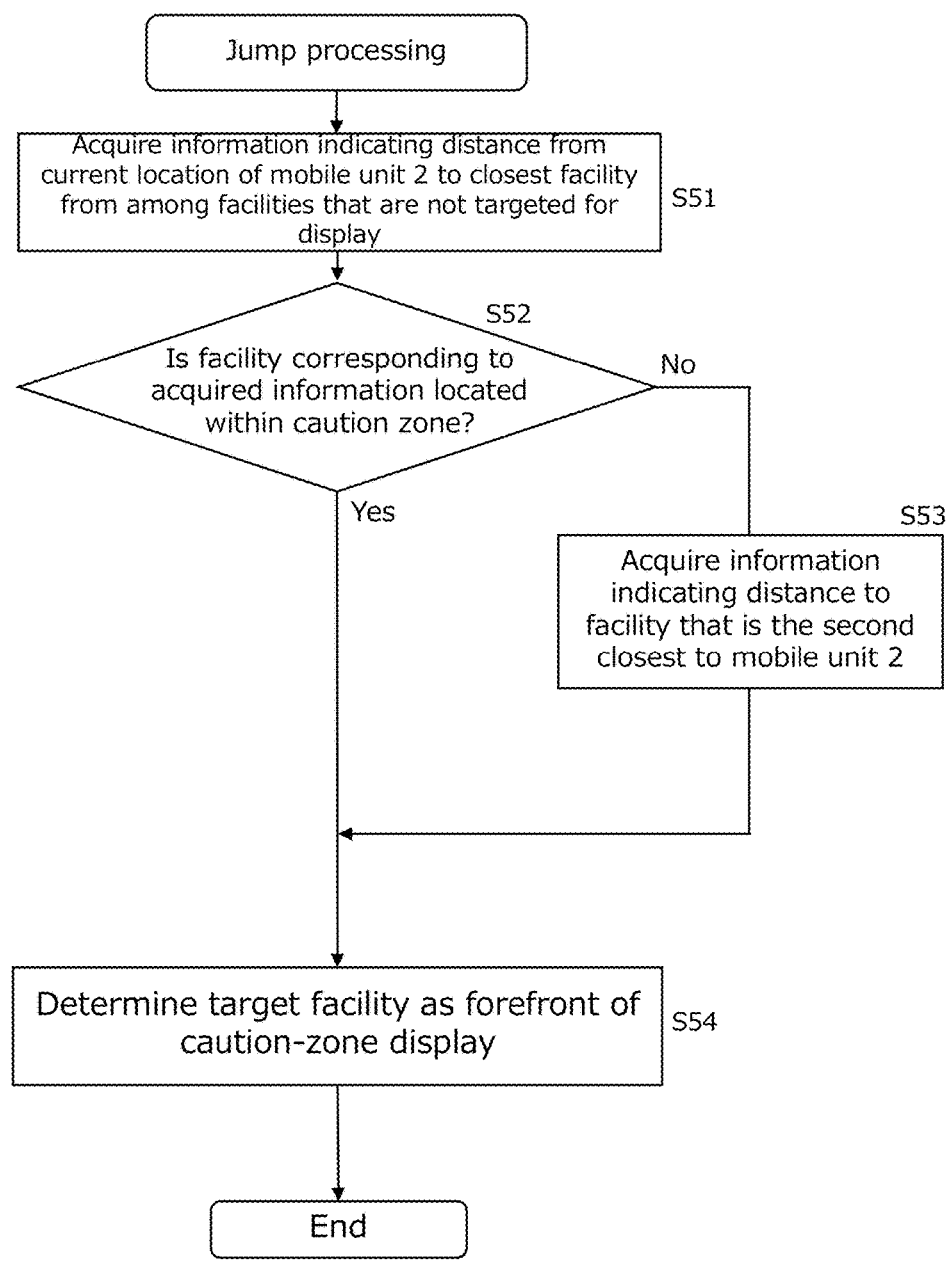

[FIG.14]
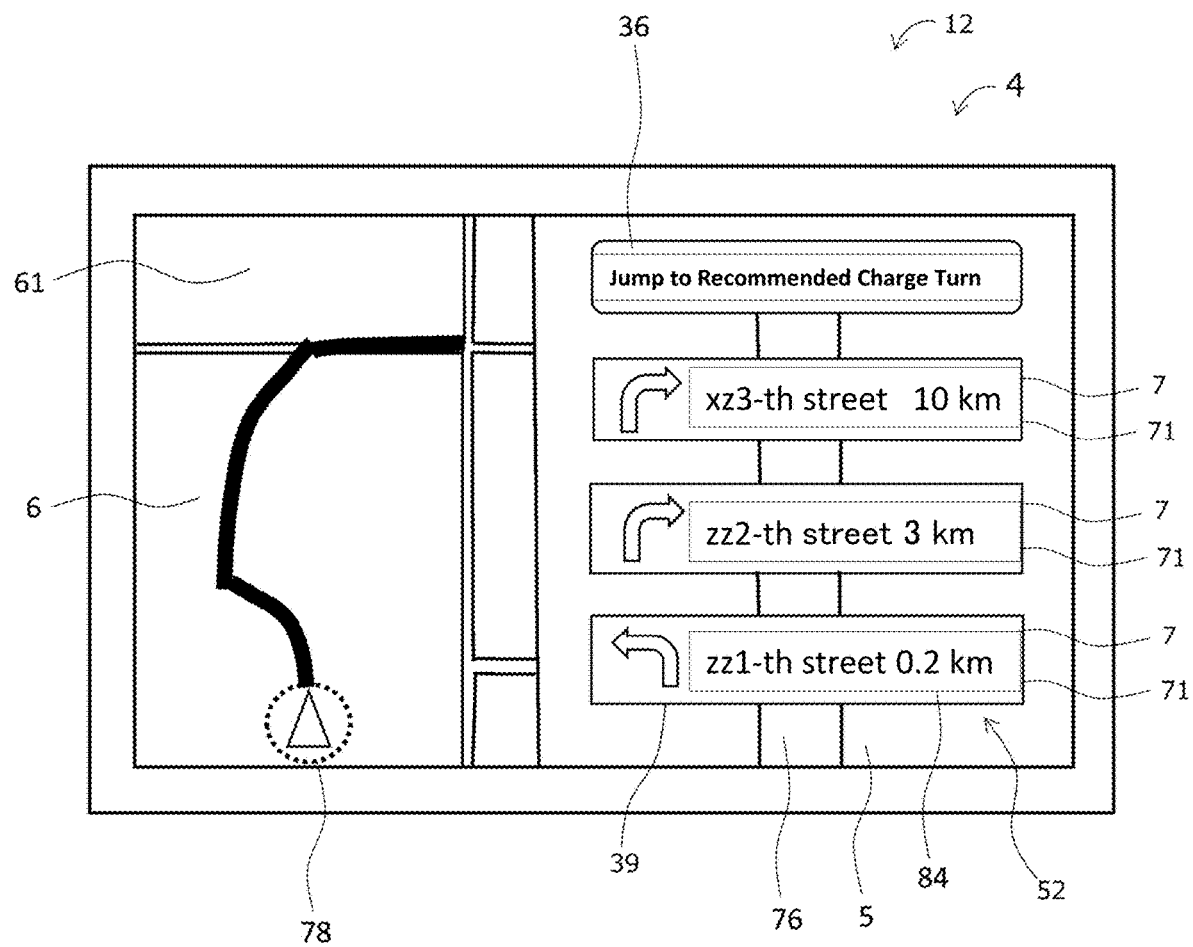

INFORMATION DISPLAY DEVICE AND CONTROL METHOD

CROSS-REFERENCE TO RELATED APPLICATIONS

This application is a continuation application of International Patent Application No. PCT/JP2023/014251 filed on Apr. 6, 2023, which claims priority to Japanese Patent Application No. 2022-079803 filed on May 13, 2022, the entire contents of which are incorporated by reference.

TECHNICAL FIELD

The present invention relates to an information display device for displaying a simplified route diagram that shows a positional relationship of a plurality of facilities located along a route on which a vehicle will travel, and also relates to a control method of causing the information display device to display the simplified route diagram.

BACKGROUND ART

Conventionally, there are navigation systems that are capable of displaying a "range map," which is a map representing a drivable distance as, for example, a concentric circle. For example, Patent Literature (PTL) 1 discloses an information system capable of displaying a road map screen in which a drivable route and roads that are not the drivable route are color-coded and displayed. According to the technique disclosed in PTL 1, a user is able to intuitively grasp a drivable range from the user's current location by viewing the road map displayed on a display.

PTL 2 discloses a navigation system capable of displaying a destination addition setting screen. The destination addition setting screen has name fields 41a, 41b, 41C, 41d, and 41e for displaying the name of each indicator. The destination addition setting screen displays a charging facility indicator CFa that serves as an indicator indicating the presence of a charging facility at the destination. The destination addition setting screen also displays a travel distance D from the start location to the destination.

PTL 3 discloses a technique for calculating a risk of battery exhaustion in an electric vehicle (EV) and displaying the degree of the risk by color for each travel segment of a travel route to the destination of the EV.

CITATION LIST

Patent Literature

PTL 1: Japanese Unexamined Patent Application Publication No. 2014-035215
PTL 2: Japanese Unexamined Patent Application Publication No. 2011-227050
PTL 3: Japanese Unexamined Patent Application Publication No. 2017-125825

SUMMARY OF INVENTION

Technical Problem

The navigation system disclosed in PTL 1 has a problem in that the road map screen does not show the locations of recharging facilities such as service areas (SAs) and parking areas (PAS) so that the user has difficulty in sensibly grasping the distance from the current location to each recharging facility.

The navigation system disclosed in PTL 2 displays the charging facility indicator CFa outside of the name fields, which requires the user to make eye movements to find the charging facility indicator CF. Besides, the charging facility indicator CFa is small in size relative to the destination addition setting screen, so that the user may overlook the charging facility indicator CFa.

In the case where an EV travels a long distance, the EV is often charged before starting the travel. In the case of applying the technique disclosed in PTL 3 to a navigation system, there is a low risk of battery exhaustion occurring immediately after the start of travel, so that the colors of prospective travel segments will remain unchanged. However, there is a possibility that the risk of battery exhaustion may increase in any of the travel segments depending on the distance traveled or the running state, and such a travel segment may not be displayed immediately after the start of travel.

It is an object of the present invention to provide an information display device and a program that enable a user to intuitively grasp the locations of recharging facilities within a drivable range while reducing eye movements of the user.

Solution to Problem

An information display device according to a first aspect of the present invention includes a display device, an input device, and a control device. The display device displays a simplified route diagram. The simplified route diagram includes a predetermined number of the names of facilities in accordance with the route list. The route list indicates the names of two or more facilities and a positional relationship of the two or more facilities with reference to a current location of a mobile unit, the two or more facilities being located along a route on which the mobile unit will travel and each being located at a different spaced distance from the current location of the mobile unit. The input device receives an instruction from a user. The control device controls the display device. The facilities are each a recharging facility where the mobile unit is capable of recharging a power source of the mobile unit. The control device acquires information on a safety-zone facility, information on a caution-zone facility, and information on an inaccessible facility. The safety-zone facility is an accessible facility whose spaced distance with respect to a drivable distance has a ratio of less than a predetermined value, the drivable distance being a distance that the mobile unit is capable of travelling without recharging the power source. The caution-zone facility is an accessible facility whose spaced distance with respect to the drivable distance has a ratio of higher than or equal to the predetermined value. The inaccessible facility is a recharging facility that is estimated to require recharging of the power source in order for the mobile unit to reach the recharging facility. When the input device has received the instruction, the control device further switches one simplified route diagram to another simplified route diagram, the one simplified route diagram being the simplified route diagram that includes names of two or more safety-zone facilities that are each the safety-zone facility and located closest to the current location, the another simplified route diagram being the simplified route diagram that includes a name of a caution-zone facility that is the caution-zone facility and located on the route ahead of the two or more safety-zone facilities.

The information display device according to the first aspect separately shows the safety-zone facilities, the caution-zone facilities, and the inaccessible facilities and enables the user to select a recharging facility that is more suitable for recharging the power source. This reduces the possibility that the power source may be recharged in a safety-zone facility when there is plenty of the remaining amount of the power source. Besides, upon receipt of an instruction, the information display device enables the user to easily and speedily grasp a recharging facility that is suitable for recharging the power source.

In the information display device according to the first aspect of the present invention, the recharging facility may be a service area that includes recharging equipment. The recharging facility may also be a parking area that includes recharging equipment. The recharging facility may also be an interchange or an intersection that is located in a neighborhood of the recharging equipment. The control device causes the display device to display the simplified route diagram in which a first graphic that encloses a first position and a second graphic that encloses a second position are aligned in order of arrangement along the route and displayed in different colors.

The information display device according to the first aspect of the present invention further includes a storage device. The storage device stores map data. The control device searches the map data for the recharging equipment that is located within a neighborhood range. The neighborhood range is a predetermined range with reference to the interchange or the intersection. The control device determines, as the recharging facility, the interchange or the intersection that includes the recharging equipment within the neighborhood range.

The information display device according to the first aspect is capable of improving customer convenience by increasing the number of recharging facilities selectable by the user.

The information display device according to the first aspect of the present invention further includes a communication device. The communication device acquires traffic information from an external device. The external device is located outside the mobile unit. The traffic information is information on the route on which the mobile unit will travel. The control device stops the acquiring of the information and the switching of the simplified route diagram when the traffic information indicating occurrence of a traffic jam on the route has been received.

The information display device according to the first aspect is capable of preventing the mixing of color coding of traffic jams and color coding of recharging facilities in the simplified route diagram and thereby decreasing the complexity of color coding in the simplified route diagram.

Advantageous Effects of Invention

The present invention enables the user to intuitively grasp the locations of recharging facilities within the drivable range while reducing eye movements of the user.

BRIEF DESCRIPTION OF DRAWINGS

FIG. 1 is a schematic configuration diagram of an information display device according to an embodiment of the present invention.

FIG. 2 shows one example of a navigation screen.

FIG. 3 shows a list of facility types.

FIG. 4 shows one example of a simplified route diagram.

FIG. 5 shows an image of a route list.

FIG. 6 shows one example of the simplified route diagram that includes a jump button.

FIG. 7 shows one example of the simplified route diagram displayed on a display device when the user has selected the jump button.

FIG. 8 is an illustration of a table that shows one example of color-coding processing performed on traffic information.

FIG. 9 is a flowchart for list update processing.

FIG. 10 is a flowchart for caution-zone information acquisition processing.

FIG. 11 is a flowchart for processing for determining facilities located beyond a warning zone FIG. 12 is a flowchart for jump-button display processing.

FIG. 13 is a flowchart for jump processing.

FIG. 14 shows another example of the simplified route diagram that includes the jump button.

DESCRIPTION OF EMBODIMENTS

As shown in FIG. 1, an information display device 1 according to one embodiment of the present invention includes an input device 11, a display device 12, a storage device 13 that stores a route list, and a control device 14. The control device 14 includes a first communication controller 15, a second communication controller 16, a navigator 17, a determiner 18, and a display controller 19. The information display device 1 is on board of a mobile unit 2. Being on board means that the information display device 1 moves together with the mobile unit 2. For example, being on board refers to installation of the information display device 1 in the mobile unit 2. Being on board also refers to temporal carrying-in of the information display device 1 into the mobile unit 2 by a user.

The information display device 1 may, for example, be a car navigation system, a smartphone, a digitizing tablet, or a personal computer. In the present embodiment, the information display device 1 is a car navigation system. The mobile unit 2 may, for example, be a vehicle. One example of the vehicle is an automobile. Another example of the mobile unit 2 is a two-wheel vehicle. The two-wheel vehicle may, for example, be a motorbike. In the present embodiment, the mobile unit 2 is an electric vehicle. The electric vehicle is driven by using electricity as its power source. In the present embodiment, the mobile unit 2 includes, in addition to the information display device 1, a position sensor 21, a power source 22, a communication device 23, and a recharger 24.

As shown in FIG. 2, the display device 12 displays a navigation screen 4. In the present embodiment, the navigation screen 4 displays a simplified route diagram based on the route list. The route list is information that includes the names of two or more facilities.

As shown in FIG. 3, facilities are classified into two or more types. Facilities are divided into those that include recharging equipment and those that do not include recharging equipment. The recharging equipment refers to equipment where the mobile unit 2 is capable of recharging the power source. The facilities including recharging equipment are hereinafter referred to as "recharging facilities." The recharging facilities are classified into accessible facilities and inaccessible facilities. The accessible facilities are recharging facilities that are estimated to be accessible by the mobile unit 2 with reference to the current location of the mobile unit 2 without recharging the power source. The inaccessible facilities are recharging facilities that are estimated to require recharging of the power source with reference to the current location of the mobile unit 2 in order for the mobile unit 2 to reach the recharging facilities. The accessible facilities are located closer to the current location of the mobile unit 2 than the inaccessible facilities. The accessible facilities are also located within a drivable range.

As shown in FIG. 4, the simplified route diagram is configured to include at least one of first graphics 7 and second graphics 8. The first graphics 7 represent accessible facilities. The second graphics 8 represent inaccessible facilities. The first graphics 7 and the second graphics 8 are displayed in different colors.

The simplified route diagram expresses a difference in the type of recharging facilities as a difference in color between the first graphics 7 and the second graphics 8. For example, the simplified route diagram may show that aaaSA (service area) and aaaPA (parking area) expressed as first graphics 7 are accessible facilities. The simplified route diagram may also show that bbbPA expressed as a second graphic 8 is an inaccessible facility. The simplified route diagram shows, by the color of the first graphics 7, that the mobile unit 2 is capable of reaching aaaSA and aaaPA without recharging the power source. The simplified route diagram also shows, by the color of the second graphic 8, that it is difficult for the mobile unit 2 to reach bbbPA without recharging the power source. The simplified route diagram indicates that the power source of the mobile unit 2 needs to be recharged in aaaSA or aaaPA that is located upstream of bbbPA. That is, the simplified route diagram indicates that aaaSA and aaaPA are located within the drivable range and bbbPA is located outside the drivable range. In this way, the information display device 1 changes color between the area around the position of the display device 12 where text data 79 indicating the name of an accessible facility is displayed and the area around the position of the display device 12 where text data 79 indicating the name of an inaccessible facility is displayed. This configuration enables the user to intuitively grasp the location of each recharging facility within the drivable range while reducing eye movements of the user, as compared with a configuration in which recharging facilities are expressed as small icons.

The position of the display device 12 where the text data 79 indicating the name of an accessible facility is displayed is hereinafter referred to as a "first position 81." The position of the display device 12 where the text data 79 indicating the name of an inaccessible facility is displayed is hereinafter referred to as a "second position 82." Note that FIG. 2 and FIGS. 4 to 7 represent a difference in color by the presence or absence of oblique lines or color filling. FIG. 2 and FIGS. 4 to 7 may also represent a difference in color by a difference in width of the oblique lines.

[Details of Each Constituent Element]

The position sensor 21 shown in FIG. 1 acquires position data on the mobile unit 2 at predetermined time intervals. The position data indicates the current location of the mobile unit 2 at the point in time when the position data is acquired. The position sensor 21 may, for example, be a global positioning system (GPS) sensor. The position data may include, for example, latitude data and longitude data. The position sensor 21 is capable of outputting the position data to the first communication controller 15.

The power source 22 includes an accumulator 22a and a power source sensor 22b. The accumulator 22a stores a power source. Examples of the power source include electricity, gasoline, and hydrogen. In the case where the power source is electricity, the accumulator 22a serves as a running battery. In the case where the power source is gasoline or hydrogen, the accumulator 22a serves as a container capable of storing the power source. For example, the power source sensor 22b may include at least one of a current sensor, a voltage sensor, or a temperature sensor. The power source sensor 22b acquires data that is used in the control device 14 to calculate the remaining amount of the power source stored in the accumulator 22a. In the case where the power source is electricity, the power source sensor 22b may detect, for example, a current value, a voltage value, and temperature of the battery. The power source sensor 22b is capable of outputting the acquired data to the determiner 18 via the first communication controller 15.

The communication device 23 communicates with an external device provided outside the mobile unit 2. The external device may, for example, be a server. One example of the server is a traffic information server 3. The traffic information server 3 distributes traffic information. The communication device 23 is capable of acquiring the traffic information from the traffic information server 3. The traffic information may include, for example, traffic jam information. The communication device 23 may, for example, be a telematics control unit (TCU). The TCU establishes two-way communication with the external device via a mobile network.

The recharger 24 is used for recharging the accumulator 22a with the power source. The recharger 24 is oriented to the outside of the mobile unit 2. The recharger 24 is connected to the accumulator 22a via a cable, a tube, or any other suitable means. In the present embodiment, the recharger 24 is configured to be connectable to a charging station via a charging cable. The charging station is capable of recharging the accumulator 22a with electricity serving as the power source. The charging station comes in two or more types. The charging station may be classified into, for example, quick charging or normal charging. For example, the charging station may be classified depending on the presence or absence of a charging cable. The charging station may be set up in, for example, a charging site.

The input device 11 is operated by a user. The user may, for example, be the driver of the mobile unit 2. The input device 11 may be configured as, for example, a touch panel that is configured integrally with the display device 12. The input device 11 may also be configured as, for example, a voice input device that is capable of inputting text data by voice. The input device 11 may also be configured as, for example, physical tab keys. In the present embodiment, the input device 11 is a touch panel. The information display device 1 is capable of detecting the position of the input device 11 pressed by a user's finger or a touch pen.

The display device 12 displays a variety of images. The display device 12 is configured as a display. The display device 12 may be configured as, for example, a touch panel. The display device 12 may also be configured as, for example, a head-up display (HUD). In the present embodiment, the display device 12 is a touch panel that is configured integrally with the input device 11.

As shown in FIG. 4, the display device 12 is capable of displaying a current location mark 78, first graphics 7, second graphics 8, and facility information 83 in a simplified route diagram 5. The current location mark 78 is an image corresponding to the mobile unit 2. The facility information 83 includes the text data 79 that indicates the name of each facility. The facility information 83 may further include image data that represents a variety of equipment included in each facility. The image data indicating a variety of equipment may be configured as, for example, a recharging equipment icon 80 that represents recharging equipment. The facility information 83 may further include text data that indicates other equipment included in each facility. The facility information 83 may further include text data 84 that indicates a spaced distance from the current location of the mobile unit 2 to each facility. The spaced distance is a distance from the current location of the mobile unit 2 to each facility along a route on which the mobile unit 2 will travel.

The simplified route diagram is formed to include at least either one of the first graphics 7 and the second graphics 8. The simplified route diagram may further include a road graphic 76. The road graphic 76 represents a road. The road graphic 76 is of a fixed shape irrespective of the shape of the road on which the mobile unit 2 is travelling. When the simplified route diagram 5 displays the first graphics 7 and the second graphics 8 at the same time, the first graphics 7 are arranged closer to the current location mark 78 than the second graphics 8. For example, the simplified route diagram 5 may display two first graphics 7 and one second graphic 8 that are aligned in order of proximity to the current location mark 78.

The first graphics 7 and the second graphic 8 each represent one facility. The first graphics 7 each have a frame line 39 that encloses the first position 81. The second graphic 8 has a frame line 39 that encloses the second position 82. The display device 12 displays the facility information 83 on accessible facilities inside the first graphics 7. The display device 12 displays the facility information 83 on inaccessible facilities inside the second graphics 8. In the simplified route diagram 5 according to the present embodiment, the first graphic 7 that represents the recharging facility located closest to the current location of the mobile unit 2 is arranged closes to the current location mark 78. The simplified route diagram 5 shows a predetermined number of facilities by using at least one of the first graphics 7 or the second graphics 8. The predetermined number may, for example, be two or more and five or less. In the present embodiment, the predetermined number is three.

The first graphics 7 and the second graphics 8 each have a breadth 7a shown in FIG. 2, which is approximately 50% or more and 100% or less of a breadth 4a of the simplified route diagram 5. The first graphics 7 and the second graphics 8 each have a longitudinal length 7b that varies depending on the number of first graphics 7 or second graphics 8 to be displayed in the simplified route diagram 5. For example, in the case where the predetermined number is three, the longitudinal length 7b of the first graphics 7 and the second graphics 8 is 5% or more and 30% or less of the longitudinal length 4b of the simplified route diagram 5.

The route list includes information indicating the names of facilities where the mobile unit 2 can make a stop. The route list also includes information indicating the names of facilities located along the route on which the mobile unit 2 will travel. The route list also includes information indicating the names of facilities in order of proximity to the current location of the mobile unit 2. In the simplified route diagram 5, text data 79 indicating the names of facilities located at relatively short spaced distances are displayed at positions that are relatively close to the current location mark 78. In the simplified route diagram 5, text data 79 indicating the names of facilities that are located at relatively long spaced distances are displayed at positions that are relatively far from the current location mark 78. In the present embodiment, the positions where the current location mark 78 and the text data 79 are displayed on the display device 12 correspond to the positional relationship between the current location of the mobile unit 2 and the facilities located along the route. This route list includes information indicating the positional relationship of the facilities located at different spaced distances.

The navigation screen 4 may further include a map 6 as shown in FIG. 2. The map 6 may include, for example, the current location mark 78 and a road graphic 61. The road graphic 61 has a shape corresponding to the shape of the road on which the mobile unit 2 is travelling. The display device 12 displays the navigation screen 4 during highway driving.

As shown in FIG. 3, accessible facilities are classified into two or more types depending on the spaced distance. In the present embodiment, accessible facilities are divided into four types including safety-zone facilities, caution-zone facilities, warning-zone facilities, and danger-zone facilities. Note that the types of the accessible facilities are not limited to four. The accessible facilities may come in three types. The accessible facilities may also come in two types. The accessible facility may also come in five or more types.

As shown in the image in FIG. 5, in the present embodiment, the display device 12 is capable of displaying safety-zone facility graphics 71, caution-zone facility graphics 72, warning-zone facility graphics 73, danger-zone facility graphics 74, and the second graphics 8 in different colors in the simplified route diagram 5. The safety-zone facility graphics 71 are first graphics 7 that represent safety-zone facilities. The caution-zone facility graphics 72 are first graphics 7 that represent caution-zone facilities. The warning-zone facility graphics 73 are first graphics 7 that represent warning-zone facilities. The danger-zone facility graphics 74 are first graphics 7 that represent danger-zone facilities.

The color of the first graphics 7 is set based on, for example, a hue circle. The hue circle changes in order of color from green to yellow to orange to red. The safety-zone facility graphics 71 may be displayed in, for example, green. The caution-zone facility graphics 72 may be displayed in, for example, yellow. The warning-zone facility graphics 73 may be displayed in, for example, orange. The danger-zone facility graphics 74 may be displayed in, for example, red. The second graphics 8 may be displayed in, for example, gray. It is preferable that the color of the safety-zone facility graphics 71 may be set so as to bring the user comfort. Conversely, it is preferable that the colors of the caution-zone facility graphics 72 and the warning-zone facility graphics 73 may be set to predominant colors so as to attract the user's attention. It is preferable that the color of the second graphics 8 may be considerably different from the colors of the caution-zone facility graphics 72 and the warning-zone facility graphics 73. For example, the color of the second graphics 8 may preferably be a color that is not included in the hue circle. Although, in the present embodiment, the first graphics 7 are color-coded by using four colors including green, yellow, orange, and red, the present invention is not limited to this configuration. The number of colors of the first graphics 7 may be less than four from the viewpoint of visibility.

The route list may include information that represents a traffic jam occurring on the route between facilities by color coding based on the traffic information acquired from the traffic information server 3. In this case, it is preferable that the route list may include information that differentiates between color coding of traffic jams and color coding of facility types. That is, it is preferable to prevent overlapping between the color representing traffic jams and the colors representing facility types.

The type of each recharging facility can be changed as a result of the power source of the mobile unit 2 being charged. For example, a warning-zone facility may be changed into a safety-zone facility after recharging of the power source of the mobile unit 2. For example, an inaccessible facility may be changed into an accessible facility after recharging of the power source of the mobile unit 2.

The recharging equipment may, for example, be a charging site. One example of the recharging equipment is a gas station. Another example of the recharging equipment is a hydrogen station. The recharging facilities may, for example, be SAs that include a charging site. The recharging facilities may, for example, be PAs that include a gas station. The recharging facilities may, for example, be interchanges (ICs) that are located in the neighborhood of a hydrogen station. In the present embodiment, the recharging facilities may be SAs or PAs that include a charging site, or may be ICs that are located in the neighborhood of a charging site.

In the present embodiment, the route list shows the recharging facilities and the facilities that do not include recharging equipment by the presence or absence of the recharging equipment icon 80, but the present invention is not limited to this configuration. In the case where there are facilities that do not include recharging equipment along the route, the route list may serve as information that express those facilities that do not include recharging equipment as graphics of the same color as the color of the second graphics 8. The facilities that do not include recharging equipment are those where the mobile unit 2 is incapable of recharging the power source. For example, in the case where the mobile unit 2 is an electric vehicle, SAs that do not include a charging site are regarded as facilities that do not include recharging equipment even if the SAs include a gas station. In the present embodiment, the route list represents an IC that includes a charging site in the neighborhood, by including the recharging equipment icon 80 within the first graphic 7 or the second graphic 8 that represents the IC. Alternatively, the route list may identify the availability or non-availability of the recharging equipment by the color of the recharging equipment icon 80 or by any other icon.

A range 20 shown in FIG. 5 corresponds to the area displayed on the display device 12. The range 20 is the user's visible range. The area represented by the route list can be changed by user's operation via the input device 11. The area represented by the route list 5 may be changed to another area located on the route ahead, by a scroll operation on the simplified route diagram 5.

The simplified route diagram 5 may display a jump button 36 shown in FIG. 6. In the present embodiment, the jump button 36 allows the displayed area to be changed into another area that includes caution-zone facilities located on the route ahead, without the need for scroll operations on the simplified route diagram 5. For example, the jump button 36 may have text saying "Jump to Recommended Recharging Facility." The recommended recharging facility refers to a facility that the information display device 1 recommends the user of the mobile unit 2 to use in order to recharge the power source. In the present embodiment, the recommended recharging facility corresponds to a caution-zone facility. The jump button 36 is displayed in the simplified route diagram 5 that shows only safety-zone facilities as facilities targeted for display. For example, the jump button 36 may be arranged adjacent to a safety-zone facility graphic 71 that represents the safety-zone facility located farthest from the current location of the mobile unit 2 among the safety-zone facilities targeted for display. For example, the jump button 36 may be arranged in such a position that represents a location farther from the current location of the mobile unit 2 than the other safety-zone facility graphics 71.

When the user has selected the jump button 36, the display device 12 displays the simplified route diagram 5 that shows a caution-zone facility at the forefront of the facilities targeted for display as shown in FIG. 7. That is, a press of the jump button 36 causes the display device 12 to switch one simplified route diagram 5 to another simplified route diagram 5, the one simplified route diagram showing facilities located closest to the current location of the mobile unit 2, the other simplified route diagram 5 showing an area that includes an caution-zone facility without the need for scroll operations on the simplified route diagram 5. In this way, the information display device 1 is capable of causing the display device 12 to provide caution-zone display at the press of the jump button 36, the caution-zone display being display of caution-zone facilities, which are facilities included in the caution zone. Therefore, even if the drivable distance is long, the information display device 1 is capable of shifting one area shown in the simplified route diagram 5 displayed based on the route list, to another area in the vicinity of the end of the drivable distance by one-touch simple operation. This enables the user to easily and speedily grasp a recharging facility suitable for the recharging of the power source. Note that the accessible facility shown at the forefront of the facilities in the switched simplified route diagram 5 is not limited to a caution-zone facility, and may be a warning-zone facility.

The storage device 13 shown in FIG. 1 includes a volatile storage device that loses its information when the power is cut, and a non-volatile storage device that retains its information even after power-off. The volatile storage device temporarily stores information processed by the control device 14. One example of the volatile storage device is random access memory (RAM). The nonvolatile storage device is a storage capable of storing a variety of information and a variety of information processing programs. The variety of information may include, for example, map data. The map data is used for displaying the map 6. The map data is also used for displaying the simplified route diagram 5. One example of the nonvolatile storage device is read only memory (ROM). For example, flash memory or a hard disk drive (HDD) may be used as the ROM.

The map data includes road information. The road information expresses the shape of a road network as a combination of nodes and links. For example, the nodes may correspond to intersections and road ends. The links correspond to positions that connect adjacent nodes. The map data includes the facility information 83 and the positional data on facilities as data that is necessary to display the simplified route diagram 5.

The storage device 13 is accessed by the control device 14. The determiner 18 is capable of selectively acquiring specific information from the map data. For example, the determiner 18 may be capable of selectively acquiring, from the map data, the facility information 83 on facilities that are located within a caution zone. This information is hereinafter referred to as "caution-zone information." Note that the configuration of the determiner 18 is not limited to acquiring the caution-zone information from the map data. The determiner 18 may be configured to acquire the caution-zone information from an external device such as the traffic information server 3. For example, the determiner 18 may be configured to acquire the caution-zone information that indicates, for example, the non-availability of facilities due to failure from an external device. For example, in the case where the route on which the mobile unit 2 will travel is an express highway, the determiner 18 may be capable of selectively acquiring, from the map data, the facility information 83 on facilities that are located along the express highway. This information is hereinafter referred to as "highway facility information." In the present embodiment, the highway facility information is information on at least one facility such as an SA, a PA, or an IC that is located along the route connected to the express highway on which the mobile unit 2 will travel.

The control device 14 is connected to each of the position sensor 21, the power source 22, the communication device 23, the input device 11, the display device 12, and the storage device 13 via signal lines 14*a*. The control device 14 may be electrically connected to these devices. The control device 14 may be configured to be connected to these devices via a bus which is not shown. For example, the control device 14 may be driven so as to effect a variety of programs stored in the storage device 13. The control device 14 may be configured as, for example, a central processing unit (CPU). The control device 14 may also be configured as, for example, a micro processing unit (MPU).

The first communication controller 15 acquires the position data from the position sensor 21. The position data indicates the current location of the mobile unit 2 at the point in time when the position data is acquired by the position sensor 21. The first communication controller 15 acquires charge remaining data from the power source sensor 22*b*. The charge remaining data indicates the remaining amount of the power source in the accumulator 22*a*. For example, the first communication controller 15 may acquire data from the position sensor 21 and the power source sensor 22*b* through controller-area-network (CAN) communication. The first communication controller 15 may also be configured to acquire data from the position sensor 21 and the power source sensor 22*b* by using a communication protocol such as LIN, FlexRay, or MOST.

In the present embodiment, the second communication controller 16 acquires the traffic information from the traffic information server 3 via the communication device 23. In order to acquire the traffic information, for example, the second communication controller 16 may transmit the position data indicating the current location of the mobile unit 2 to the traffic information server 3. The second communication controller 16 receives traffic information on the area to which the mobile unit 2 is directed, from the traffic information server 3 via the communication device 23.

The navigator 17 guides the mobile unit 2 from the start location to the destination. The navigator 17 sets the route on the basis of the current location of the mobile unit 2 and the destination. In order to set the route, the navigator 17 acquires the position data indicating the current location of the mobile unit 2 from the position sensor 21. In order to set the route, the navigator 17 also acquires destination information. The destination information indicates the destination. The destination is set by the user via the input device 11. For example, the destination information may be stored in the aforementioned volatile storage medium. The navigator 17 guides the user to the route via the navigation screen 4.

The determiner 18 determines the type of each facility targeted for display. The determiner 18 determines the type of each facility on the basis of the ratio of the spaced distance to the drivable distance. In order to calculate the above ratio, the determiner 18 calculates the drivable distance. The determiner 18 calculates the drivable distance on the basis of the charge remaining data. In order to calculate the above ratio, the determiner 18 also calculates the spaced distance. The determiner 18 calculates the spaced distance on the basis of the map data and the position data indicating the current location of the mobile unit 2. The determiner 18 compares the spaced distance to each facility targeted for display with the drivable distance. The above ratio is hereinafter referred to as a "drivable ratio."

In the present embodiment, the determiner 18 determines each facility targeted for display as one of the safety-zone facility, the caution-zone facility, the warning-zone facility, and the danger-zone facility on the basis of the drivable ratio. The safety-zone facilities are facilities whose drivable ratios are lower than a first predetermined value. The first predetermined value may, for example, be 50%. The safety-zone facilities are facilities that are located at positions that do not require recharging of the power source. The caution-zone facilities are facilities whose drivable ratios are higher than or equal to the first predetermined value and lower than a second predetermined value. The second predetermined value may, for example, be 60%. The caution-zone facilities are located at positions where it is recommended to recharge the power source if the recharging equipment is not used by any other user and is available. It can be said that the caution-zone facilities are located at positions where it is recommended to recharge the power source when the user will take a break. The warning-zone facilities are facilities whose drivable ratios are higher than or equal to the second predetermined value and lower then a third predetermined value. The third predetermined value may, for example, be 75%. It can be said that the warning-zone facilities are located at positions where it is recommended to recharge the power source. The danger-zone facilities are facilities whose drivable ratios are higher than or equal to the third predetermined value and lower than a fourth predetermined value. The fourth predetermined value may, for example, be 80%. It can be said that the danger-zone facilities are located at positions up to which the user should not postpone recharging of the power source. The inaccessible facilities are facilities whose drivable ratios are lower than or equal to the fourth predetermined value. By determining the type of each facility, the determiner 18 generates at least one of the information on the accessible facilities or the information on the inaccessible facilities. The information on the accessible facilities includes at least one of the information on the safety-zone facilities, the information on the caution-zone facilities, the information on the warning-zone facilities, and the information on the danger-zone facilities.

The determiner 18 is capable of determining the facility located closest to the current location of the mobile unit 2 among the caution-zone facilities included in the caution zone. The determined facility is hereinafter also referred to as the "forefront of the caution-zone display." The determiner 18 determines, as the forefront of the caution-zone display, the facility located closest to the current location of the mobile unit 2 among the facilities whose drivable ratios are higher than or equal to the first predetermined value and lower than the second predetermined value. In the case where recharging equipment is included in none of the facilities whose drivable ratios are higher than or equal to the first predetermined value and lower than the second predetermined value, the determiner 18 may determine a safety-zone facility that includes recharging equipment as the forefront of the caution-zone display. In this case, the determiner 18 may determine, as the forefront of the caution-zone display, a safety-zone facility that is located farthest from the current location of the mobile unit 2 among the safety-zone facilities that include recharging equipment.

The determiner 18 may also be configured to stop the processing for color-coding the facilities depending on facility type when the communication device 23 has received the traffic information on the route on which the mobile unit 2 will travel. In this case, for example, the determiner 18 may determine color coding depending on the contents of the traffic information and the types of the faculties targeted for display.

Specifically, for example, in the case where safety-zone facilities are targeted for display as shown in FIG. 8, the determiner 18 may determine to display the traffic information in the simplified route diagram 5. In this case, the simplified route diagram 5 does not display the information on the drivable range, although it indicates the occurrence of at least one of events such as a traffic jam, road closing, an accident, or roadworks on the route ahead of the mobile unit 2. That is, the display controller 19 displays the simplified route diagram 5 in which the color of the road graphic 76 has changed to green or red, in accordance with the route list and the traffic information. The road graphic 76 displayed in green or red indicates the occurrence of a traffic jam on the corresponding road. The display controller 19 may also display the simplified route diagram 5 in which the color of the road graphic 76 has changed to black. The road graphic 76 displayed in black indicates the presence of road closing on the corresponding road. The display controller 19 may also display, for example, a predetermined icon that indicates the presence of an accident or roadworks in the simplified route diagram 5.

The determiner 18 may also be configured to, when caution-zone facilities or danger-zone facilities are targeted for display, determine not to display at least part of the traffic information in the simplified route diagram 5. The traffic information that is not to be displayed in the simplified route diagram 5 may, for example, be traffic information that indicates the occurrence of a traffic jam. In this case, the simplified route diagram 5 indicates the presence of at least one of events such as road closing, accidents, and roadworks on the road ahead of the mobile unit 2. However, even if a traffic jam has occurred on the road ahead, the simplified route diagram 5 does not indicate the occurrence of the traffic jam on the road ahead. In the case where the color that represents traffic jams is similar to the color of the caution-zone facility graphics 72 in the simplified route diagram 5, the determiner 18 determines not to display the traffic information on traffic jams in the simplified route diagram 5. This prevents traffic jams and caution-zone facilities from becoming indistinguishable from each other in the simplified route diagram 5. Note that, if the color of traffic jams and the color of caution-zone facilities are easily distinguishable, the determiner 18 may be configured to also display the traffic information on traffic jams in the simplified route diagram 5. Similarly to the caution-zone facilities, the determiner 18 also makes the same determinations for the danger-zone facilities. In the case where the danger-zone facilities are targeted for display, there is a possibility that the mobile unit 2 may become incapable of running due to a shortage of the power source in the accumulator 22a. This may lower the level of priority given to displaying the traffic information indicating traffic jams in the simplified route diagram 5, as compared to the case where caution-zone facilities are targeted for display. That is, in the case where danger-zone facilities are targeted for display, the simplified route diagram 5 is less likely to display the traffic information on traffic jams than in the case where caution-zone facilities are targeted for display. In the case where danger-zone facilities are targeted for display, the simplified route diagram 5 provides display of the traffic information on road closing together with display of the drivable range that is color-coded by the facility type. This allows the information display device 1 to prevent the mixing of color coding of traffic jams and color coding of recharging facilities in the simplified route diagram 5 and thereby to decrease the complexity of color coding in the simplified route diagram 5.

In the present embodiment, the determiner 18 determines, as recharging facilities, ICs that include recharging equipment located within a neighborhood range. The neighborhood range refers to a predetermined range with reference to the location of the IC. For example, the neighborhood range may be a range within a radius of 3 km from the IC. The determiner 18 searches the map data for ICs that include recharging equipment located within the neighborhood range from among ICs that are located along the route on which the mobile unit 2 will travel. The determiner 18 determines whether there is any recharging equipment accessible from an open road within the neighborhood range. This allows the information display device 1 to increase the number of recharging facilities selectable by the user and thereby improve customer convenience. The simplified route diagram may display the recharging equipment icon 80 in the frame 39 of the first graphic 7 as shown in FIG. 7 to indicate the availability or non-availability of the recharging equipment by color or by the icon itself.

The information display device 1 as described above corresponds to a computer. In the present embodiment, the first communication controller 15, the second communication controller 16, the navigator 17, the determiner 18, and the display controller 19 shown in FIG. 1 may be realized by, for example, a hardware processor such as a CPU executing software programs stored in the storage device 13. Some or all of these constituent elements may be realized by hardware such as a large-scale integration (LSI) circuit, an application specific integrated circuit (ASIC), a field-programmable gate array (FPGA), or a graphics processing unit (GPU), or may be realized by cooperation of software and hardware. The software programs may be stored in advance in the storage device 13 such as an HDD or flash memory. The software programs may also be stored in a removable storage medium such as a DVD or a CD-ROM and installed in the information display device 1 by inserting the storage medium into the information display device 1.

[List Update Processing]

The information display device 1 according to the present embodiment starts list update processing shown in the flowchart in FIG. 9 when the mobile unit 2 has approached an express highway. In the following description, the letter "S" in each flowchart denotes a step.

In S1, the determiner 18 calculates the drivable distance of the mobile unit 2 in accordance with the remaining amount of data in the power source.

In S2, the determiner 18 compares the drivable distance calculated in S1 and the spaced distance from the current location of the mobile unit 2 to each facility targeted for display.

In S3, the determiner 18 determines, on the basis of the comparison result obtained in S2, whether the facility targeted for display is a caution-zone facility. If the facility targeted for display is a caution-zone facility, the determiner 18 proceeds to the processing of S4. If the facility targeted for display is not a caution-zone facility, the determiner 18 proceeds to the processing of S7.

In S4, the determiner 18 determines whether the caution-zone facility is the farthest facility among the facilities targeted for display. If the caution-zone facility is the farthest facility among the facilities targeted for display, the determiner 18 proceeds to the processing of S5. If the caution-zone facility is not the farthest facility among the facilities targeted for display, the determiner 18 proceeds to the processing of S6.

In S5, the determiner 18 determines the facility farthest from the current location of the mobile unit 2 among the facilities targeted for display, as the forefront of the caution-zone display. This allows the information display device 1 to notify the user of the mobile unit 2 of the fact that there are no recharging facilities in the neighborhood. Then, the determiner 18 ends the processing.

In S6, the display controller 19 displays the simplified route diagram 5 based on the route list on the display device 12.

In S7, the determiner 18 performs caution-zone-information acquisition processing. Through this processing, the determiner 18 acquires information on facilities that are located within the caution zone.

In S8, the determiner 18 determines, on the basis of the highway facility information acquired from the map data stored in the storage device 13, whether recharging equipment is included in any of the facilities located within the caution zone. If recharging equipment is included in any of the facilities located within the caution zone, the determiner 18 proceeds to the processing of S9. If recharging facility is included in none of the facilities located within the caution zone, the determiner 18 proceeds to the processing of S10.

In S9, the display controller 19 causes the display device 12 to display the simplified route diagram based on the route list.

In S10, the determiner 18 acquires the highway facility information from the map data stored in the storage device 13, the highway facility information indicating facilities that are located before the caution zone, i.e., facilities located upstream of the caution zone. In the present embodiment, the facilities located upstream of the caution zone are facilities that are located within the safety zone.

In S11, the determiner 18 determines, on the basis of the highway facility information acquired in S10, whether recharging equipment is included in any of the facilities located upstream of the caution zone. If recharging equipment is included in any of the facilities located upstream of the caution zone, the determiner 18 proceeds to the processing of S12. If recharging equipment is included in none of the facilities located upstream of the caution zone, the determiner 18 proceeds to the processing to S5.

In S12, the determiner 18 determines, as the forefront of the caution-zone display, the facility that is determined as including recharging equipment in S11.

In S13, the determiner 18 performs processing for determining facilities that are located beyond the warning zone. Then, the determiner 18 ends the processing.

[Caution-Zone Information Acquisition Processing]

In S21 shown in FIG. 10, the determiner 18 acquires caution-zone information from the map data stored in the storage device 13.

In S22, the determiner 18 determines, on the basis of the caution-zone information acquired in S21, whether each caution-zone facility is an SA or a PA or any other facility. If the caution-zone facility is an SA or a PA, the determiner 18 proceeds to the processing of S23. If the caution-zone facility is neither an SA nor a PA, the determiner 18 proceeds to the processing of S26.

In S23, the determiner 18 acquires the highway facility information from the map data stored in the storage device 13.

In S24, the determiner 18 determines, on the basis of the highway facility information acquired in S23, whether the SA or PA includes recharging equipment. If the SA or the PA includes recharging equipment, the determiner 18 proceeds to the processing of S25. If the SA or the PA does not include recharging equipment, the determiner 18 proceeds to the processing of S28.

In S25, the determiner 18 determines the SA or PA detected in S22 as a recharging facility. Then, the determiner 18 ends the processing.

In S26, the determiner 18 determines whether there is recharging equipment within the neighborhood range of an IC that will be passed by the mobile unit 2. If there is recharging equipment within the neighborhood range of the IC, the determiner 18 proceeds to the processing of S27. If there is no recharging equipment within the neighborhood range of the IC, the determiner 18 proceeds to the processing of S28.

In S27, the determiner 18 determines the IC located within the caution zone as a recharging facility. Then, the determiner 18 ends the processing.

In S28, the determiner 18 determines that there are no recharging facilities within the caution zone. Then, the determiner 18 ends the processing.

[Processing for Determining Facilities Beyond Warning Zone]

In S31 shown in FIG. 11, the determiner 18 determines the closest distance to the warning zone and the farthest distance to the warning zone. The closest distance to the warning zone is the distance from the current location of the mobile unit 2 to the location that is closest to the mobile unit 2 within the warning zone. The farthest distance to the warning zone is the distance from the current location of the mobile unit 2 to the location that is farthest from the mobile unit 2 within the warning zone.

In S32, the determiner 18 determines whether there is any facility within the warning zone. If there is any facility within the warning zone, the determiner 18 proceeds to the processing of S33. If there are no facilities within the warning zone, the determiner 18 ends the processing.

In S33, the determiner 18 performs warning-zone information acquisition processing. The warning-zone information acquisition processing is similar to the caution-zone information acquisition processing shown in FIG. 10. In the warning-zone information acquisition processing, the determiner 18 uses information on the facilities located within the warning zone, instead of the information on the facilities located within the caution zone. The determiner 18 determines the presence or absence of recharging facilities within the warning zone by the warning-zone information acquisition processing. Through the warning-zone information acquisition processing, the determiner 18 determines the type of each facility located within the warning zone.

In S34, the determiner 18 determines whether recharging equipment is included in any of the facilities located within the warning zone. If recharging equipment is included in any of the facilities located within the warning zone, the determiner 18 proceeds to the processing of S35. If recharging equipment is included in none of the facilities located within the warning zone, the determiner 18 proceeds to the processing of S39.

In S35, the determiner 18 determines, as warning-zone facilities, facilities that are located within the farthest distance in the warning zone, excluding safety-zone facilities and caution-zone facilities.

In S36, the determiner 18 determines whether there is any facility on the route ahead of the warning zone. If there is any facility on the route ahead of the warning zone, the determiner 18 proceeds to the processing of S37. If there are no facilities on the route ahead of the warning zone, the determiner 18 ends the processing.

In S37, the determiner 18 determines, as danger-zone facilities, facilities that are located on the route ahead of the warning zone, excluding inaccessible facilities.

In S38, the determiner 18 determines, as inaccessible facilities, facilities that are located on the route ahead of the danger zone. Then, the determiner 18 ends the processing.

In S39, the determiner 18 changes the farthest facility located within the caution zone to a warning-zone facility. The determiner 18 determines facilities that are located ahead of that warning-zone facility, excluding inaccessible facilities, as danger-zone facilities. In this way, if there are no recharging facilities within the warning zone, the determiner 18 is capable of determining, as a warning-zone facility, the recharging facility that is located farthest from the current location of the mobile unit 2 within the caution zone located upstream.

In S40, the determiner 18 determines facilities that are located on the route ahead of the danger zone, as inaccessible facilities. Then, the determiner 18 ends the processing.

[Processing for Displaying Jump Button 36]

The information display device 1 according to the present embodiment performs processing for displaying the jump button 36 shown in FIG. 12 when the mobile unit 2 has approached an express highway.

In S41, the determiner 18 determines facilities that are located within the caution zone. This means that facilities that are located within the warning zone and the danger zone are excluded from the facilities targeted for display.

In S42, the determiner 18 determines whether each facility located within the caution zone is targeted for display. If the facility within the caution zone is targeted for display, the determiner 18 ends the processing. If the facility within the caution zone is not targeted for display, the determiner 18 proceeds to the processing of S43.

In S43, the determiner 18 determines whether the facilities within the caution zone are located on the same route. If the facilities within the caution zone are on the same route, the determiner 18 proceeds to the processing of S44. If the facilities within the caution zone are not on the same route, the determiner 18 ends the processing.

In S44, the display controller 19 displays the jump button 36 in the simplified route diagram 5. Then, the display controller 19 ends the processing.

[Jump Processing]

The information display device 1 according to the present embodiment performs jump processing shown in FIG. 13 when the user has tapped the jump button 36.

In S51, the determiner 18 acquires information that indicates the distance from the current location of the mobile unit 2 to the closest facility among facilities that are not targeted for display.

In S52, the determiner 18 determines whether the facility corresponding to the information acquired in S41 is located within the caution zone. If the facility is located within the caution zone, the determiner 18 proceeds to the processing of S54. If the facility is not located within the caution zone, the determiner 18 proceeds to the processing of S53.

In S53, the determiner 18 acquires information that indicates a distance to the facility that is the second closest to the current location of the mobile unit 2 next to the facility detected in S42, among the facilities that are not targeted for display.

In S54, the determiner 18 determines the target facility as the forefront of the caution-zone display. The target facility refers to the facility that has been determined as being located within the caution zone by the determiner 18 in S52 or the facility that corresponds to the information acquired in S53. Then, the determiner 18 ends the processing.

A conceivable comparative example of the present invention is a navigation system for electric vehicles (EVs) provided with a "range map" function. This navigation system, however, has problems described below and is difficult to use during highway driving. In particular, this navigation system is often judged as being unusable when considering the next charging during long-distance driving.

Firstly, even if the drivable range is shown on the map, the names of ICs, SAs, and PAs are not indicated in the drivable range shown on the map. Or, even if the names of ICs, SAs, and PAs are indicated in the drivable range shown on the map, the graphic size of these names are small and difficult to see, which may degrade visibility.

Secondly, if the drivable distance is long, the user needs to scroll the map screen in order to identify the drivable range. Such an operation is troublesome to the user and will entail danger during driving.

Thirdly, scrolling of the map or list during driving could be a target for operational restrictions during driving and may become impossible to perform depending on the manufacturer.

Lastly, even if the user is able to grasp the names of ICs, SAS, or PAs located within the drivable range on the map, the user will have difficulty in developing a depth perception from the current location to those ICs, SAs, or ICs.

As described above, the range map is difficult for the user to check and to understand during driving unless the user is familiar with places. The range map of a commonly used scale for navigation screens also has a problem that it is difficult to offer a broad view of the map unless the user performs a scroll operation on the map. In particular, the range map is difficult to use when determining locations drivable by EVs that are manufactured with increased drivable distances these days. Besides, when the user wants to know specific names of ICs, SAs, or PAs while driving the mobile unit, those names are difficult to see on the map, so that the user needs to scroll the navigation screen during driving.

In contrast, the information display device 1 according to the present embodiment performs the following control during highway driving and during display of the simplified route diagram. The control involves:

1. Calculating the drivable distance at regular intervals.
2. Checking the drivable distance and the spaced distance to each facility displayed in the simplified route diagram and color-coding and displaying facilities shown in the simplified route diagram according to four categories based on the check result, the four categories including the "safety zone," the "caution zone," the "warning zone," and the "danger zone."
3. Determining not to provide color-coded display if there is a caution zone within the range that can be displayed from the current location of the mobile unit 2 without scrolling, in order to eliminate the color-coded display from becoming an obstacle to display of warning information such as the latest traffic-jam information. However, an exception is made for the case where there are no facilities targeted for display in the neighborhood of the mobile unit 2. One example of the exception is the case where the distance from the current location of the mobile unit 2 to each recharging facility targeted for color-coded display exceeds a predetermined value. The predetermined value may, for example, be 20 km. Accordingly, even if the mobile unit 2 travels on an express highway along which facilities are located away from each other by approximately 30 km, it is possible to reduce the possibility that the user of the mobile unit 2 may overlook a recharging facility and fail to recharge the power source.

4. fixedly displaying a facility that is located within the caution zone or the danger zone at the farthest end of the displayed simplified route diagram, and using it as a reminder.

5. Making the display of the above 4. switchable between on and off to suit the preferences of the user.

6. Targeting not only SAs and PAs but also ICs for color-coded display. Each IC is searched for depending on whether there is any recharging equipment on an open road within a radius of, for example, 3 km from the IC, and the search result is added to conditions for color-coded display.

7. Adding information on SAs and PAs that include recharging facility to the conditions for color-coded display.

8. Not worrying about the availability or non-availability of recharging equipment.

9. Displaying a broader range as a target for color-coded display if there is an IC that does not include recharging equipment and there is also an SA or a PA that does not include recharging equipment within the neighborhood range. This further reduces the possibility that the mobile unit 2 may stop on an express highway due to power source exhaustion.

10. Providing color-coded display irrespective of whether the mobile unit is during route guidance or not during route guidance. When the simplified route diagram is interrupted by route switching, the drivable distance is calculated again after switching and reflected on the simplified route diagram displayed after switching.

For example, in the case where the mobile unit is running on an express highway, the information display device 1 according to the present embodiment described thus far is capable of easily determining to which SA, PA, or IC the mobile unit can travel without recharging the power source. This reduces eye movements and navigation operations of the user and accordingly improves the level of safety.

The information display device 1 according to the present embodiment is also favorably usable in EVs that have longer drivable distances, and the route list can be utilized as means for expressing the drivable range, instead of the range map. This allows the mobile unit 2 to recognize a desirable recharging facility from the names of ICs, SAs, and PAs that are identified during highway driving.

Accordingly, even in the case where the user drives on the express highway for the first time, it is possible to reduce the user's strain caused by the feelings of anxiety about not being able to grasp the drivable distance. Besides, simplifying the display of the route list allows the route list to be displayed in an HUD or a liquid crystal display of the meter cluster, and further reduces eye movements of the user who is trying to grasp the drivable range. The route list also enables the user to grasp the drivable range even not during route guidance.

That is, the information display device 1 according to present embodiment has the following effects.

It is possible to utilize the simplified route diagram that is convenient for the user to grasp the spaced distance from the current location of the mobile unit 2 to each of ICs, SAs, and PAS.

It is possible to broaden the range targeted for display because the use of the route list eliminates the need for a large screen.

It is possible to display the drivable range that requires minimum eye movements of the user.

It is possible to acquire a pinpoint knowledge of the area in the vicinity of the boundary of the drivable range by means of combination of voice recognition and steering switch operations.

It is possible even for the user who is unfamiliar with places or who is not good at map reading to easily understand the drivable range, because "accessible places" are indicated by the names of ICs or SAs and PAS.

It is possible to prevent not only EVs but also gasoline-powered vehicles from being run out of gas because the user utilizes the information display device as a measure of gassing when driving an unused rental or sharing car.

While the embodiment of the present invention has been described thus far, the device configuration, the control method, and so on are not only limited to the above-described embodiment.

For example, the simplified route diagram 5 may be displayed based on a turn list as shown in FIG. 14. The turn list refers to information that includes data to be displayed, such as intersections, road types and distances, and an expected time of arrival at each intersection on the route along which the vehicle travels toward the destination. In the present embodiment, the jump button 36 enables the user to change one area represented by the turn list to another area that includes caution-zone facilities located on the route ahead without the need for scroll operations on the simplified route diagram 5. For example, the jump button 36 may have letters saying "Jump to Recommended Recharge Turn." The recommended recharge turn refers to an intersection in the neighborhood of which there is recharging equipment where the information display device 1 causes the user to recharge the power source. In the present embodiment, the recommended recharge turn corresponds to an intersection included in the caution zone. The jump button 36 is displayed in the simplified route diagram 5 that shows only intersections included in the safety zone as intersections targeted for display. For example, the jump button 36 and the safety-zone turn graphic 71 forming the route list may be arranged in a line. For example, the jump button 36 may be arranged adjacent to a safety-zone turn graphic 71 that is located farthest from the current location of the mobile unit 2 and that represents an intersection located within the safety zone targeted for display. The jump button 36 may be arranged in, for example, such a position that indicates the fact that the jump button 36 is located farther from the current location of the mobile unit 2 than the other safety-zone turn graphics 71.

For example, a configuration is also possible in which limitations are imposed on the information to be displayed in the simplified route diagram, and display is switched to another display specialized for the drivable distance.

The display of the simplified route diagram 5 based on the route list expands the range of possibilities such as a simplified display in an HUD or a meter cluster and alleviates the feelings of anxiety about the drivable distance. The display of a portrait screen by using the simplified route diagram also improves visibility in smartphone applications.

The information display device 1 according to the present embodiment is not limited to being configured to cause the mobile unit 2 to display the simplified route diagram corresponding to an express highway. A configuration is also possible in which the mobile unit 2 displays the route list that corresponds to roads other than so-called "express highways" such as Freeway or Motorway. The information display device 1 is favorably applicable to roads that have long distances to the next turn point. Moreover, the information display device 1 may be configured to display the simplified route diagram that corresponds to an open road.

The other configuration may also be modified in various ways within a range that does not deviate from the gist of the present invention. The configurations according to the embodiment and the variations described above may be used in combination.

REFERENCE SIGNS LIST 1 information display device
2 mobile unit
7 first graphic
8 second graphic
12 display device
14 control device
23 communication device
79 text data
81 first position
82 second position

The invention claimed is:
1. An information display device comprising:
a storage device;
a display device that generates a route list and a route map including a current location of a mobile unit, and displays the route map and a simplified route diagram obtained from the route list, the route list including names of a plurality of facilities and a positional relationship of the plurality of facilities with reference to the current location of the mobile unit, the plurality of facilities being located along a route on which the mobile unit will travel and each being located at a different spaced distance from the current location of the mobile unit, the simplified route diagram including a predetermined number of the names of the plurality of facilities;
an input device that receives an instruction from a user; and
a control device that controls the display device,
wherein the plurality of facilities are each a recharging facility where the mobile unit is capable of recharging a power source of the mobile unit, and are each categorized as a safety-zone facility, a caution-zone facility, or an inaccessible facility,
the safety-zone facility being an accessible facility whose spaced distance with respect to a drivable distance has a ratio of less than a predetermined value, the drivable distance being a distance that the mobile unit is capable of travelling without recharging the power source,
the caution-zone facility being an accessible facility whose spaced distance with respect to the drivable distance has a ratio of higher than or equal to the predetermined value,
the inaccessible facility being the recharging facility that is estimated to require recharging of the power source in order for the mobile unit to reach the recharging facility,
wherein the control device causes a jump button to be displayed in the simplified route diagram with the route map including the current location of the mobile unit when the simplified route diagram does not include a name of any caution-zone facility and includes names of two or more safety-zone facilities that are located closest to the current location,
when the jump button is selected by the instruction, the control device switches the simplified route diagram from a first mode to a second mode, the second mode including a name of a caution-zone facility located on the route ahead of the two or more safety-zone facilities to be displayed with the route map including the current location of the mobile unit,
the storage device stores original data of the plurality of facilities listed in order of distance from the current location of the mobile unit in a predetermined range,
the original data includes a first part in which a facility closest from the current location of the mobile unit and other two or more facilities are listed in order of distance from the current location of the mobile unit,
the original data further includes a second part in which a caution-zone facility closest from the current location of the mobile unit listed at a top followed by other two or more facilities in order of distance from the current location of the mobile unit next to the caution-zone facility listed at the top,
the display device displays the first part of the original data as the simplified route diagram in the first mode unless the jump button is selected, and
the display device displays the second part of the original data as the simplified route diagram in the second mode when the jump button is selected.
2. The information display device according to claim 1, wherein
the recharging facility is one of a service area, a parking area, and either an interchange or an intersection, the service area including recharging equipment that recharges the power source of the mobile unit, the parking area including the recharging equipment, the interchange or the intersection being located in a neighborhood of the recharging equipment, and
the control device causes the display device to display the simplified route diagram in which a first graphic that encloses a first position and a second graphic that encloses a second position are aligned in order of arrangement along the route and displayed in different colors.
3. The information display device according to claim 2, further comprising:
a storage device that stores map data,
wherein the control device searches the map data for the recharging equipment that is located within a predetermined neighborhood range from the interchange or the intersection, and
the control device determines, as the recharging facility, the interchange or the intersection that includes the recharging equipment within the predetermined neighborhood range, or the service area including recharging equipment.
4. A control method to be executed by an information display device,
the information display device including:

a storage device;
a display device;
an input device that receives an instruction from a user; and
a control device that controls the display device,
the control method comprising:
reading data from the storage device;
causing the display device to generate a route list and a route map including a current location of a mobile unit, and display the route map and a simplified route diagram obtained from the route list, the route list including names of a plurality of facilities and a positional relationship of the plurality of facilities with reference to the current location of the mobile unit, the plurality of facilities being located along a route on which the mobile unit will travel and each being located at a different spaced distance from the current location of the mobile unit, the simplified route diagram including a predetermined number of the names of the plurality of facilities, the plurality of facilities being each categorized as a safety-zone facility, a caution-zone facility, or an inaccessible facility,
the safety-zone facility being an accessible facility whose spaced distance with respect to a drivable distance has a ratio of less than a predetermined value, the drivable distance being a distance that the mobile unit is capable of travelling without recharging a power source of the mobile unit,
the caution-zone facility being an accessible facility whose spaced distance with respect to the drivable distance has a ratio of higher than or equal to the predetermined value,
the inaccessible facility being the recharging facility that is estimated to require recharging of the power source in order for the mobile unit to reach the recharging facility;
displaying a jump button in the simplified route diagram with the route map including the current location of the mobile unit when the simplified route diagram does not include a name of any caution-zone facility and includes names of two or more safety-zone facilities that are located closest to the current location, and
when the jump button is selected by the instruction, switching the simplified route diagram from a first mode to a second mode, the second mode including a name of a caution-zone facility located on the route ahead of the two or more safety-zone facilities to be displayed with the route map including the current location of the mobile unit, the storage device stores original data of the plurality of facilities listed in order of distance from the current location of the mobile unit in a predetermined range,
the original data includes a first part in which a facility closest from the current location of the mobile unit and other two or more facilities are listed in order of distance from the current location of the mobile unit,
the original data further includes a second part in which a caution-zone facility closest from the current location of the mobile unit listed at a top followed by other two or more facilities in order of distance from the current location of the mobile unit next to the caution-zone facility listed at the top,
such that the method includes causing the display device to display the first part of the original data as the simplified route diagram in the first mode unless the jump button is selected, and to display the second part of the original data as the simplified route diagram in the second mode when the jump button is selected.

\* \* \* \* \*